J. HAMILTON.
COMBINED COVER AND SOCKET PIECE.
APPLICATION FILED DEC. 16, 1907.
1,001,948.
Patented Aug. 29, 1911.
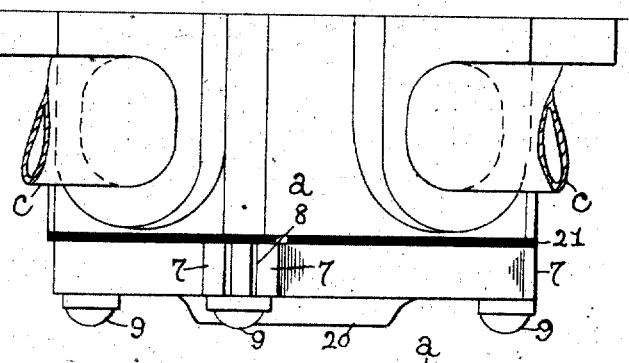
Fig. 1.
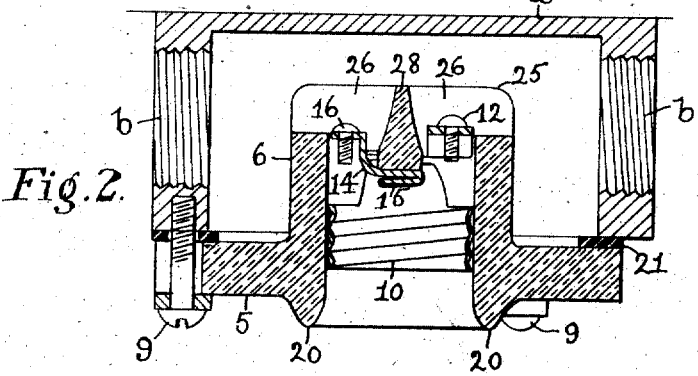
Fig. 2.
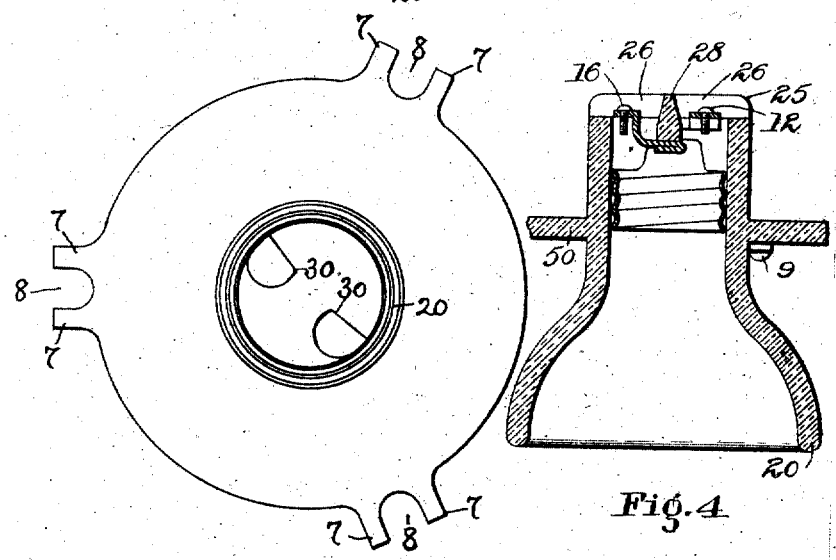
Fig. 3.
Fig. 4.
Witnesses.
C. H. Gannett
J. Murphy
Inventor.
John Hamilton
By Jas. H. Churchill
Atty.

UNITED STATES PATENT OFFICE.

JOHN HAMILTON, OF JAMAICA PLAIN, MASSACHUSETTS.

COMBINED COVER AND SOCKET-PIECE.

1,001,948.  Specification of Letters Patent.  Patented Aug. 29, 1911.

Application filed December 16, 1907. Serial No. 406,693.

*To all whom it may concern:*

Be it known that I, JOHN HAMILTON, a citizen of the United States, residing in Jamaica Plain, county of Suffolk, and State of Massachusetts, have invented an Improvement in a Combined Cover and Socket-Piece, of which the following description, in connection with the accompanying drawings, is a specification, like letters on the drawings representing like parts.

This invention relates to a combination cover and socket piece of insulating material, especially designed and adapted among other uses, to be employed in connection with a metallic junction box, whereby the said box may be provided with an efficient and inexpensive cover having a socket which is extended into the box and is provided with terminals with which electrical connection may be made with the line or circuit wires within the box, thereby protecting the connections from moisture and enabling the usual rosette commonly employed with metallic covers of junction boxes to be dispensed with, and the connections between said terminals and the circuit wires to be made at a minimum expense. These and other features of this invention will be pointed out in the claims at the end of this specification.

Figure 1 is an elevation of a metallic junction box provided with a combined cover and socket piece embodying this invention. Fig. 2, a central vertical section of the junction box and its cover shown in Fig. 1, and Fig. 3, an underside view of the cover shown in Fig. 1. Fig. 4, a modification to be referred to.

The metal junction box $a$, provided in its side walls with threaded openings $b$, for the reception of the conduits or pipes $c$ through which the circuit or line wires, not shown, are led into the box $a$, may be of any suitable or usual construction.

As now commonly constructed and known to me, metallic junction boxes are provided with metallic covers to close the mouths of the same and, upon which is mounted the usual rosette comprising a base and a cap of insulating material. This construction is not only expensive on account of the cost of the separate parts but also on account of the work required to secure the parts together, which necessitated drilling the metal cover to receive the screws employed to fasten the cover to the box, also drilling and tapping two holes in the metal cover to receive the screws which held the base of the rosette to the metal cover of the junction box. Further the metal cover had to be drilled and bushed with insulating material for the passage of the circuit wires from the interior of the junction box to the connecting screws on the base of the rosette. The cap of the rosette was provided with connecting screws to which one end of the lamp cord was attached, the other end being connected with the lamp socket. The cap of the rosette was mechanically fastened to the base of the rosette by clips and screws, which fastenings also served to act as circuit connections.

In the present instance, the metallic cover, the rosette comprising the base and cap, the labor incident to this construction, and also the exposed electrical connections have been dispensed with, which has been accomplished by providing a combined cover 5 and socket piece 6 in one piece of insulating material such as porcelain. The cover 5 is of sufficient width or diameter to close the mouth of the box $a$ and is provided as herein shown with lugs or ears 7 forming openings 8 for the passage of the screws 9, which are inserted into threaded holes in the sides of the box $a$. The socket piece 6 is extended from the back of the cover so as to project well into the box $a$, and is provided on its inner side with a screw-threaded terminal 10 to which a terminal screw 12 is connected, and is further provided with a terminal 14 having a spring or yielding finger 15, and to which the terminal screw 16 is connected. The terminals 10, 14 coöperate with the usual terminals of the lamp, when the latter is screwed into the socket piece 6, and the terminal screws 12, 16, are connected by suitable wires (not shown) with the line or circuit wires within the box. The socket piece is preferably provided with a projecting lip or front portion 20, which extends beyond the front of the cover and acts as a deflector to shed moisture which may accumulate on the outer surface of the cover, and if desired, the lip 20 may be made flaring and long enough to be used as a reflector for the lamp inserted into the socket piece (see Fig. 4.

The socket piece is provided in its bottom wall 25 with slots or openings 26 for the reception of the terminal screws 12, 16, and which slots communicate through openings 30 with the interior of the socket and permit the connection between the branch wires and the terminals of the socket to be made from outside of the socket piece, thereby leaving the terminal screws readily accessible and effecting a considerable saving in time and labor in making the connections. The slots 26 may be separated by a transverse wall 28 integral with the socket piece and forming an arc-interrupting wall between the terminals 12, 16, and the slots 26 are of sufficient depth to enable the terminals 12, 16 to be located below the rear surface of the socket piece and be thereby protected from accidental short circuits by contact of the rear surface of the socket piece with metal. A water-tight joint may be effected between the cover 5 and the box $a$ by a washer 21 of rubber or other suitable material.

The connections between the terminals of the socket piece 6 and the line wires are effected within the junction box $a$ by soldering one end of the branch or lamp wires directly to the line wires, the other end of the lamp wires being connected with the terminal screws 12, 16.

The combination cover and socket piece provided within it with circuit terminals is especially designed to be used in connection with a junction box, inasmuch as a superior electrical connection is obtained, which is protected from moisture, and because the initial cost and that of maintenance is materially reduced.

While the combination cover and socket piece of insulating material is especially applicable for use with junction boxes, I do not desire to limit the invention otherwise than by the scope of the allowed claims.

Claims.

1. The combination with a metal junction box provided with side walls forming the mouth for the box and having openings therein for the passage into the box of circuit wires, of a combined cover and socket piece of insulating material comprising a cover of an area equal to the area of the mouth of the box to close the same and secured to said box, a socket piece of less area than said cover and extended from the back of the cover into said box, and a lip or flange extended from the front of said cover around the socket therein, and circuit terminals within said socket piece capable of being connected with the circuit wires in the box, substantially as described.

2. A one-piece combination cover and socket piece of insulating material, said cover having openings extended through it near its circumference and said socket piece extending from the back of the cover and surrounded on all sides by the same and provided in its surface with slots for the reception of terminal screws, a lip or flange extended from the front of the cover, and circuit terminals within said socket piece, which are engaged by the terminal screws in said slots, substantially as described.

3. A one-piece combination cover and socket piece of insulating material, said cover having openings extended through it near its circumference and said socket piece extending from the back of the cover and surrounded on all sides by the same and provided in its rear surface with slots for the reception of terminal screws, and with a wall extended transversely of said slots between the same, a lip or flange extended from the front of the cover, and circuit terminals within said socket which are engaged by the terminal screws in said slots, substantially as described.

4. A one-piece combination cover and socket piece of insulating material, said cover having openings extended through it near its circumference and said socket piece extending from the back of the cover and surrounded on all sides thereof by said cover and provided with a bottom wall having in its outer surface slots for the reception of terminal screws capable of being located below the outer surface of said bottom wall, a lip or flange extended from the front of the cover, and circuit terminals within said socket piece, which are engaged by the terminal screws in said slots, substantially as described.

5. A one-piece combination cover and socket piece of insulating material, said cover having openings extended through it near its circumference and said socket piece extending from the back of the cover and surrounded on all sides thereof by said cover and provided with a bottom wall having in its outer surface transversely extended slots for the reception of terminal screws and separated by a wall extended transversely of said slots between the same, a lip or flange extended from the front of the cover, and circuit terminals within said socket which are engaged by the terminal screws in said slots, substantially as described.

In testimony whereof, I have signed my name to this specification in the presence of two subscribing witnesses.

JOHN HAMILTON.

Witnesses:
JAS. H. CHURCHILL,
J. MURPHY.